(12) United States Patent
Lai et al.

(10) Patent No.: US 11,480,997 B1
(45) Date of Patent: Oct. 25, 2022

(54) INTERFACE ADAPTER

(71) Applicant: SHENZHEN OKUTE ELECTRONIC TECHNOLOGY CO., LTD., Shenzhen (CN)

(72) Inventors: Chunxiang Lai, Shenzhen (CN); Bo Duan, Shenzhen (CN)

(73) Assignee: SHENZHEN OKUTE ELECTRONIC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/575,589

(22) Filed: Jan. 13, 2022

(30) Foreign Application Priority Data

Dec. 24, 2021 (CN) .......................... 202111600915.2

(51) Int. Cl.
| | |
|---|---|
| *H01R 13/72* | (2006.01) |
| *G06F 1/16* | (2006.01) |
| *H01R 13/506* | (2006.01) |
| *H01R 31/06* | (2006.01) |

(52) U.S. Cl.
CPC .......... *G06F 1/1632* (2013.01); *H01R 13/506* (2013.01); *H01R 31/065* (2013.01)

(58) Field of Classification Search
CPC .. H01R 13/72; H01R 13/443; H01R 13/6464; H01R 13/506; H01R 31/06; H01R 31/065; H02G 11/02; G06F 1/181; G06F 1/1632
USPC .......... 439/501, 502, 528, 623, 654; 361/679.01; 191/12.2, 12.4
See application file for complete search history.

(56) References Cited

U.S. PATENT DOCUMENTS

| | | | | | |
|---|---|---|---|---|---|
| 4,978,949 | A | * | 12/1990 | Herron | G06F 1/166 361/679.21 |
| 5,071,367 | A | * | 12/1991 | Luu | H02G 11/02 439/502 |
| 5,460,547 | A | * | 10/1995 | Belt | G06F 3/0227 439/652 |
| 5,779,499 | A | * | 7/1998 | Sette | H01R 31/06 439/654 |
| 6,167,183 | A | * | 12/2000 | Swain | G02B 6/4454 385/137 |
| 6,321,340 | B1 | * | 11/2001 | Shin | G06F 1/3209 710/1 |
| 6,558,201 | B1 | * | 5/2003 | Begley | H01R 31/06 439/955 |
| 6,574,120 | B1 | * | 6/2003 | Chou | H02G 11/02 361/776 |

(Continued)

FOREIGN PATENT DOCUMENTS

| | | |
|---|---|---|
| CN | 206908051 | 1/2018 |
| CN | 209657181 | 11/2019 |

(Continued)

*Primary Examiner* — Thanh Tam T Le

(57) ABSTRACT

An interface adapter includes an adapter body. An interface converting circuit board, a male connector group electrically connected to the interface converting circuit board, and a female connector group electrically connected to the interface converting circuit board are disposed on the adapter body. The male connector group includes a first male connector and a second male connector. The first connector and the second connector are disposed on a same side surface of the adapter body. A spacing adjusting assembly configured to adjust a spacing between the first connector and the second connector is disposed on the adapter body.

7 Claims, 3 Drawing Sheets

(56) References Cited

U.S. PATENT DOCUMENTS

| | | | | |
|---|---|---|---|---|
| 6,705,890 B2* | 3/2004 | Kitou | ............... | H01R 13/72 |
| | | | | 439/501 |
| 6,705,891 B1* | 3/2004 | Lin | ............... | H01R 13/60 |
| 6,722,917 B2* | 4/2004 | Huang | ............... | H01R 25/003 |
| | | | | 439/502 |
| 6,796,844 B1* | 9/2004 | Edwards, III | ......... | H01R 25/00 |
| | | | | 439/676 |
| 6,943,527 B2* | 9/2005 | Liu | ............... | H01M 50/284 |
| | | | | 320/112 |
| 6,948,966 B2* | 9/2005 | Kambayashi | ......... | G06F 1/1616 |
| | | | | 439/362 |
| 7,004,785 B2* | 2/2006 | Melton | ............ | B26B 19/3833 |
| | | | | 242/405.1 |
| 7,072,200 B2* | 7/2006 | Lanni | ............... | H01R 31/065 |
| | | | | 363/146 |
| 7,125,265 B2* | 10/2006 | Weng | ............... | H01R 27/00 |
| | | | | 361/752 |
| 7,361,050 B2* | 4/2008 | Mori | ............... | H02G 3/32 |
| | | | | 439/501 |
| 7,467,971 B2* | 12/2008 | Lin | ............... | H01R 13/73 |
| | | | | 439/501 |
| 7,503,808 B1* | 3/2009 | O'Shea | ............ | H01R 31/065 |
| | | | | 439/639 |
| 7,510,426 B2* | 3/2009 | Hwang | ............... | H01R 25/00 |
| | | | | 439/501 |
| 7,746,029 B2* | 6/2010 | Toya | ............... | H02J 7/0042 |
| | | | | 320/113 |
| 7,887,341 B2* | 2/2011 | Liao | ............... | H01R 27/02 |
| | | | | 439/131 |
| 7,911,757 B2* | 3/2011 | Hsu | ............... | H01R 13/6666 |
| | | | | 439/339 |
| 8,215,983 B2* | 7/2012 | Obata | ............... | H05K 5/0247 |
| | | | | 439/528 |
| 8,670,225 B2* | 3/2014 | Nunes | ............... | G01D 9/005 |
| | | | | 361/679.01 |
| 8,870,601 B2* | 10/2014 | Lee | ............... | H01R 31/06 |
| | | | | 439/131 |
| 9,373,921 B1* | 6/2016 | Lin | ............... | H01R 13/70 |
| 10,468,842 B2* | 11/2019 | Sun | ............... | H01R 24/64 |
| 10,483,681 B1* | 11/2019 | Du | ............... | H04L 69/08 |
| 10,797,425 B1* | 10/2020 | Young | ............... | H01R 13/35 |
| 10,978,841 B2* | 4/2021 | Liao | ............... | H01R 13/60 |
| 11,152,036 B2* | 10/2021 | Kuriyama | ............... | G06F 1/16 |

FOREIGN PATENT DOCUMENTS

| | | |
|---|---|---|
| CN | 210326339 | 4/2020 |
| CN | 211151006 U | 7/2020 |

* cited by examiner

INTERFACE ADAPTER

TECHNICAL FIELD

The present disclosure relates to a field of interface adapter technology, and in particular to an interface adapter with high applicability.

BACKGROUND

Interface converters, also known as docking stations, hubs, etc., are widely used digital auxiliary products. Chinese patent application No. 201720469643.X discloses a dual-interface positive and negative plug-in power data docking station. There are two Type-C interfaces fixedly disposed on a same side of the docking station to match two interfaces on a MACBOOK PRO product. However, one defect of this docking station is that it can only be applied to the MACBOOK PRO product. For product with other brands and specifications, the docking station is difficult to apply to two interfaces with different spacings. Thus, the docking station has limitations.

SUMMARY

A technical problem to be solved by the present disclosure is to provide an interface adapter with high applicability in view of the above-mentioned defects in the prior art.

The technical problem is solved by providing an interface adapter with high applicability.

The interface adapter with high applicability comprises an adapter body. An interface converting circuit board, a male connector group electrically connected to the interface converting circuit board, and a female connector group electrically connected to the interface converting circuit board are disposed on the adapter body. The male connector group comprises a first male connector and a second male connector. The first connector and the second connector are disposed on a same side surface of the adapter body. A spacing adjusting assembly configured to adjust a spacing between the first connector and the second connector is disposed on the adapter body.

In one embodiment of the interface adapter with high applicability of the present disclosure, the spacing adjusting assembly comprises a sliding groove disposed on the adapter body. A sliding block matched with the sliding groove is disposed on the first male connector.

In one embodiment of the interface adapter with high applicability of the present disclosure, the sliding groove is disposed in an interior of the adapter body. An outer surface of the adapter body is provided with a first opening groove communicated with the sliding groove. An interface of the first male connector is exposed from the first opening groove.

In one embodiment of the interface adapter with high applicability of the present disclosure, the outer surface of the adapter body is provided with a second opening groove communicated with the sliding groove. The second opening groove is configured to have the sliding block be removed from the second opening groove.

In one embodiment of the interface adapter with high applicability of the present disclosure, the first male connector is connected to the interface converting circuit board through a flexible connecting wire.

In one embodiment of the interface adapter with high applicability of the present disclosure, the side surface of the adapter body is provided with a winding groove matched with the flexible connecting wire. The winding groove is communicated with the sliding groove.

In one embodiment of the interface adapter with high applicability of the present disclosure, a connecting point of the flexible connecting wire is disposed at an end of the adapter body, or the connecting point of the flexible connecting wire and the second male connector are respectively disposed on two sides of the adapter body.

In one embodiment of the interface adapter with high applicability of the present disclosure, the winding groove winds the end of the adapter body. A portion of the winding groove located at the end of the adapter body is arc-shaped.

In one embodiment of the interface adapter with high applicability of the present disclosure, the second male connector is fixedly connected to the adapter body or the interface converting circuit board.

In one embodiment of the interface adapter with high applicability of the present disclosure, the spacing adjusting assembly comprises a driving unit. The driving unit drives one or both of the first male connector and the second male connector to move so that the first male connector and the second male connector move toward each other.

By setting the spacing adjusting assembly, the spacing between the first male connector and the second male connector on the same side of the adapter body is adjusted, so that the interface adapter of the present disclosure is matched with two interfaces on one side of digital product with different brand and specifications.

BRIEF DESCRIPTION OF DRAWINGS

In order to clearly describe technical solutions in the embodiments of the present disclosure, the present disclosure will be further described below with reference to the accompanying drawings and embodiments. The drawings in the following description are merely some of the embodiments of the present disclosure, and those skilled in the art are able to obtain other drawings according to the drawings without contributing any inventive labor.

DETAILED DESCRIPTION

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Embodiment 1

Figure 1:
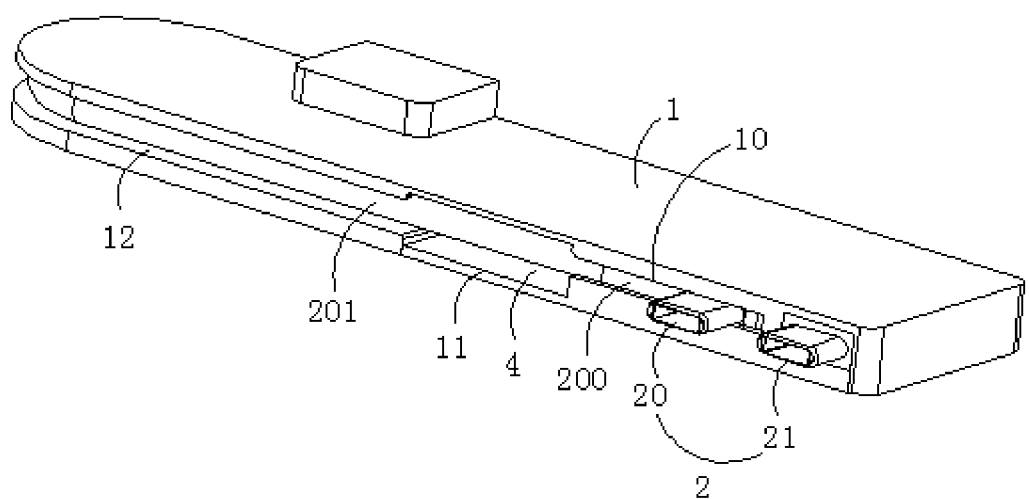
FIG. 1 is a schematic structural diagram of an interface adapter with high applicability according to one optional embodiment of the present disclosure where a flexible connecting wire is in a retracted state.
Figure 2:
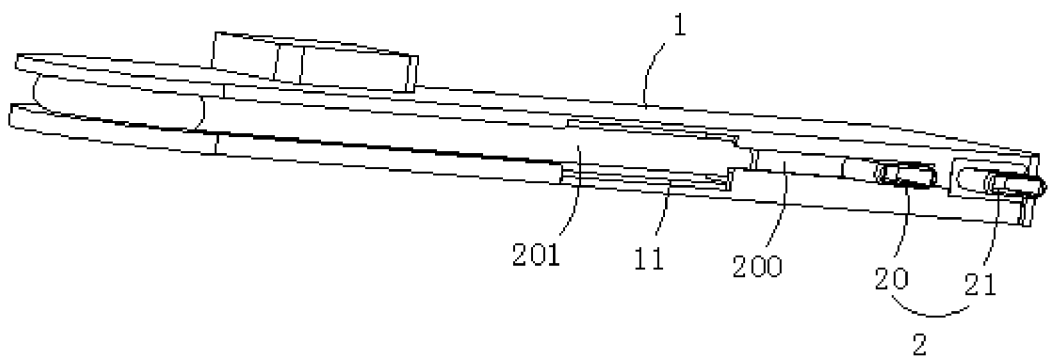
FIG. 2 is another schematic structural diagram of the interface adapter with high applicability according to one optional embodiment of the present disclosure where the flexible connecting wire is in the retracted state.
Figure 3:
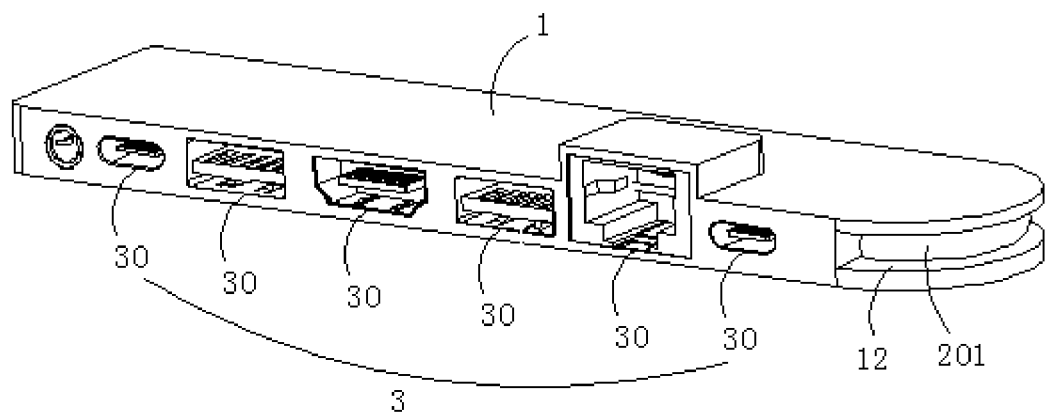
FIG. 3 is a rear side schematic structural diagram of the interface adapter with high applicability according to one optional embodiment of the present disclosure where the flexible connecting wire is in the retracted state.
Figure 4:
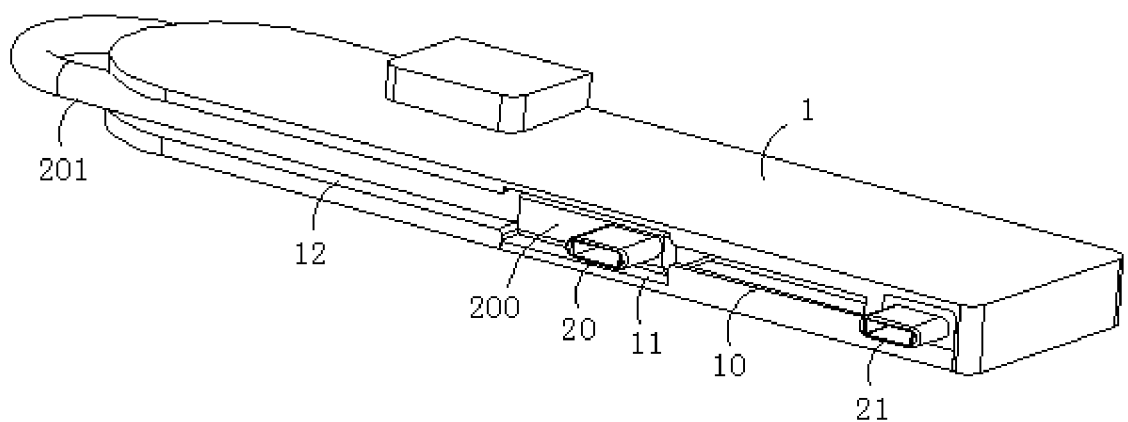
FIG. 4 is a schematic structural diagram of the interface adapter with high applicability according to one optional embodiment of the present disclosure where a sliding block is taken out.
Figure 5:
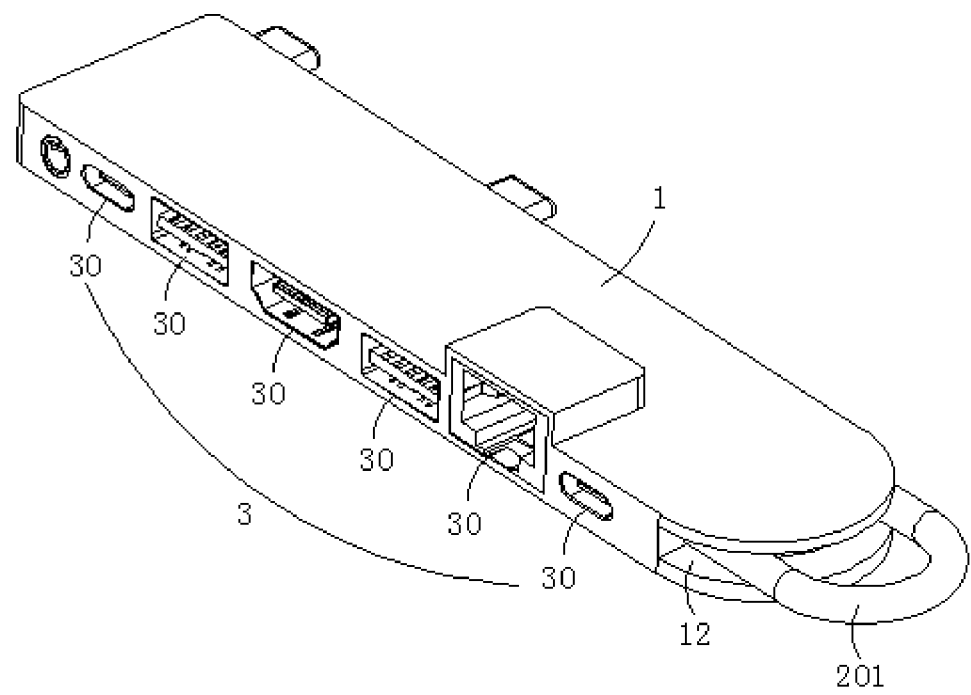
FIG. 5 is a rear side schematic structural diagram of the interface adapter with high applicability according to one optional embodiment of the present disclosure where the sliding block is taken out.
Figure 6:
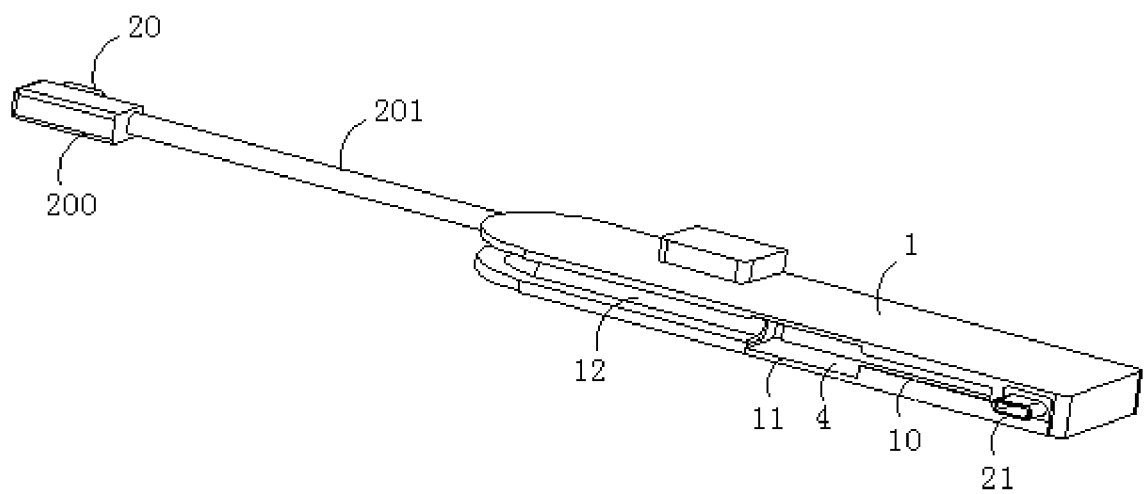
FIG. 6 is a schematic structural diagram of the interface adapter with high applicability according to one optional embodiment of the present disclosure where the flexible connecting wire is in an extended state.
Figure 7:
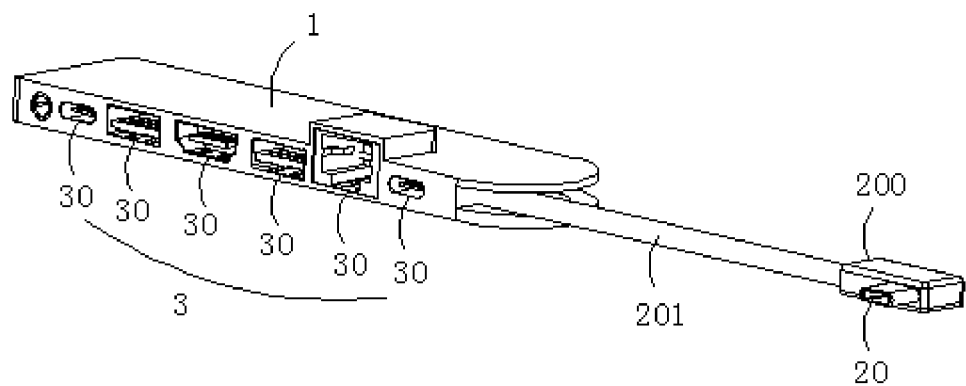
FIG. 7 is a rear side schematic structural diagram of the interface adapter with high applicability according to one optional embodiment of the present disclosure where the flexible connecting wire is in the extended state.

As shown in FIGS. 1-7, in one optional embodiment of an interface adapter with high applicability of the present disclosure, the interface adapter with high applicability comprises an adapter body 1. An interface converting circuit board (not shown in the drawings), a male connector group 2 electrically connected to the interface converting circuit board, and a female connector group 3 electrically connected to the interface converting circuit board are disposed on the adapter body 1. The male connector group comprises a first male connector 20 and a second male connector 21. The first connector 20 and the second connector 21 are disposed on a same side surface of the adapter body 1. A spacing adjusting assembly configured to adjust a spacing between the first connector 20 and the second connector 21 is disposed on the adapter body 1.

By setting the spacing adjusting assembly, the spacing between the first male connector 20 and the second male connector 21 on the same side of the adapter body 1 is adjusted, so that the interface adapter of the present disclosure is matched with two interfaces on one side of digital product with different brand and specifications.

It should be noted that the spacing adjusting assembly is able to adopt following structure in the embodiment, or the spacing adjusting assembly is able to adopt the structure described in the embodiment 2. The two structures of the spacing adjusting assembly are implemented and are able to achieve effect of solving the technical problem of the present disclosure, and are within the protection scope of the present disclosure.

Optionally, the spacing adjusting assembly comprises a sliding groove 4 disposed on the adapter body 1. A sliding block 200 matched with the sliding groove 4 is disposed on the first male connector 20.

In this way, the sliding block 200 is directly formed or assembled with the first male connector 20, and the sliding groove 4 is provided on the adapter body 1, so the spacing between the first connector 20 and the second connector 21 is adjusted by dialing the sliding block 200. The structure of the present disclosure is simple and it is relatively convenient to use the interface adapter of the present disclosure.

Furthermore, a plurality of gear adjusting pieces, such as soft blocks, tightening screws, etc., are disposed in the sliding groove 4 to realize positioning of the sliding block 200 after sliding, so as to ensure the reliability of adjustment.

Furthermore, the sliding groove 4 is disposed in an interior of the adapter body 1. An outer surface of the adapter body is provided with a first opening groove 10 communicated with the sliding groove 4. An interface of the first male connector 20 is exposed from the first opening groove 10.

The sliding groove 4 is a built-in sliding groove 4, and the first opening groove 10 is defined on an outside to expose the interface of the first male connector 20, which make the sliding block 200 to have good moving stability and is convenient to process and form. Meanwhile, the side surface where the first male connector 20 is disposed has good flatness.

Furthermore, the outer surface of the adapter body 1 is provided with a second opening groove 11 communicated with the sliding groove 4. The second opening groove 11 is configured to have the sliding block 200 be removed from the second opening groove. In this way, the sliding block 200 is conveniently taken out, which is easy to assemble and has good integrity.

It should be noted that the first male connector 20 is connected to the interface converting circuit board through a flexible connecting wire 201. It is also possible to arrange a group of moving contact points on the first male connector 20 and multiple groups of static contact points on the adapter body to ensure the electrical connection after the gear is adjusted.

The flexible connecting wire 201 is a data line, or a flexible circuit board, etc.;

When the first male connector 20 is connected to the interface converting circuit board through the flexible connecting wire 201. The first male connector 20 is easily separated from the adapter body and used as a conventional data connector that can be moved at any angle. The interface adapter is converted between a two-connector interface adapter and a single-interface interface adapter, so the interface adapter is used for dual-connector computers with different spacing, single-connector computers, and mobile phones, which further enriches product functions and applicability.

Furthermore, the side surface of the adapter body 1 is provided with a winding groove 12 matched with the flexible connecting wire 201. The winding groove 12 is communicated with the sliding groove 4.

The flexible connecting wire 201 is stored through the winding groove 12 to ensure the integrity of the interface adapter. Moreover, in a normal storage state, flexibility of the flexible connecting wire 201 itself provides a certain supporting force to the first male connector 20, so connecting head of the first male connector 20 is maintained in being received in the first opening groove 11.

Furthermore, a connecting point of the flexible connecting wire 201 is disposed at an end of the adapter body 1, or the connecting point of the flexible connecting wire 201 and the second male connector 21 are respectively disposed on two sides of the adapter body 1. This kind of layout makes the flexible connecting wire 201 have a long length.

Furthermore, the winding groove 12 winds the end of the adapter body 1. A portion of the winding groove 12 located at the end of the adapter body 1 is arc-shaped, which is convenient for winding, and prevents the flexible connecting wire 201 from being damaged at a winding bend position.

Furthermore, the second male connector 21 is fixedly connected to the adapter body 1 or the interface converting circuit board. Optionally, the second male connector 21 is configured to be fixed and non-movable. Of course, the second male connector 21 is also able to be configured to be fixed and detachable. When the second male connector 21 is detachable connected, the second male connector may be connected to the interface converting circuit board through a data line.

Optionally, the first male connector and the second male connector are selected from Type-C connectors, USB connectors, or a mixture of the Type-C connector and the USB connector.

The female connector group 3 comprises female connectors 30. Each female connector is selected from a VGA interface, a DVI interface, a DP interface, a Mini DP interface, a network interface, a USB interface, etc.

Embodiment 2

In another optional embodiment of the interface adapter with high applicability of the present disclosure, the spacing adjusting assembly comprises a driving unit. The driving unit drives one or both of the first male connector and the second male connector to move so that the first male connector and the second male connector move toward each other.

In the embodiment, the spacing adjusting assembly comprises the driving unit. In specific implementation, the driving unit is bale to adopt the conventional driving methods. For example, a micromotor drives a one-way or two-way screw to drive the first male connector and the second male connector to move toward each other, or the micromotor drives a rack and pinion group to drive the second male connector and the second male connector to move towards each other.

When adjusting, the moving male connector is electrically connected to the interface converting circuit board through a data line.

It should be understood that those of ordinary skill in the art can make improvements or changes based on the above description, and all these improvements and changes should fall within the protection scope of the appended claims of the present disclosure.

What is claimed is:

1. An interface adapter, comprising an adapter body, a male connector group disposed on a first side of the adapter body, and a female connector group disposed on a second side of the adapter body; wherein the second side is opposite to the first side, and the male connector group comprises a first male connector and a second male connector; the first male connector and the second male connector are disposed on a same side surface of the adapter body; a spacing adjusting assembly configured to adjust a spacing between the first male connector and the second male connector is disposed on the adapter body; wherein the spacing adjusting assembly comprises a sliding groove disposed on the adapter body; a sliding block matched with the sliding groove is disposed on the first male connector;

wherein the sliding groove is disposed in an interior of the adapter body; an outer surface of the adapter body is provided with a first opening groove communicated with the sliding groove; an interface of the first male connector is exposed from the first opening groove.

2. The interface adapter according to claim 1, wherein the outer surface of the adapter body is provided with a second opening groove communicated with the sliding groove; the second opening groove is configured to have the sliding block be removed from the second opening groove.

3. The interface adapter according to claim 1 wherein a side surface of the adapter body is provided with a winding groove matched with a flexible connecting wire; the winding groove is communicated with the sliding groove.

4. The interface adapter according to claim 3, wherein a connecting point of the flexible connecting wire is disposed at an end of the adapter body, or the connecting point of the flexible connecting wire and the second male connector are respectively disposed on two sides of the adapter body.

5. The interface adapter according to claim 3, wherein the winding groove winds the end of the adapter body; a portion of the winding groove located at the end of the adapter body is arc-shaped.

6. The interface adapter according to claim 1, wherein the second male connector is fixedly connected to the adapter body.

7. The interface adapter according to claim 1. wherein the spacing adjusting assembly comprises a driving unit; the driving unit drives one or both of the first male connector and the second male connector to move so that the first male connector and the second male connector move toward each other.

* * * * *